May 11, 1954     R. V. GERHARDT     2,678,228
DIAGNOSTIC INSTRUMENT WITH MAGNETIC CONNECTOR
Filed June 8, 1951
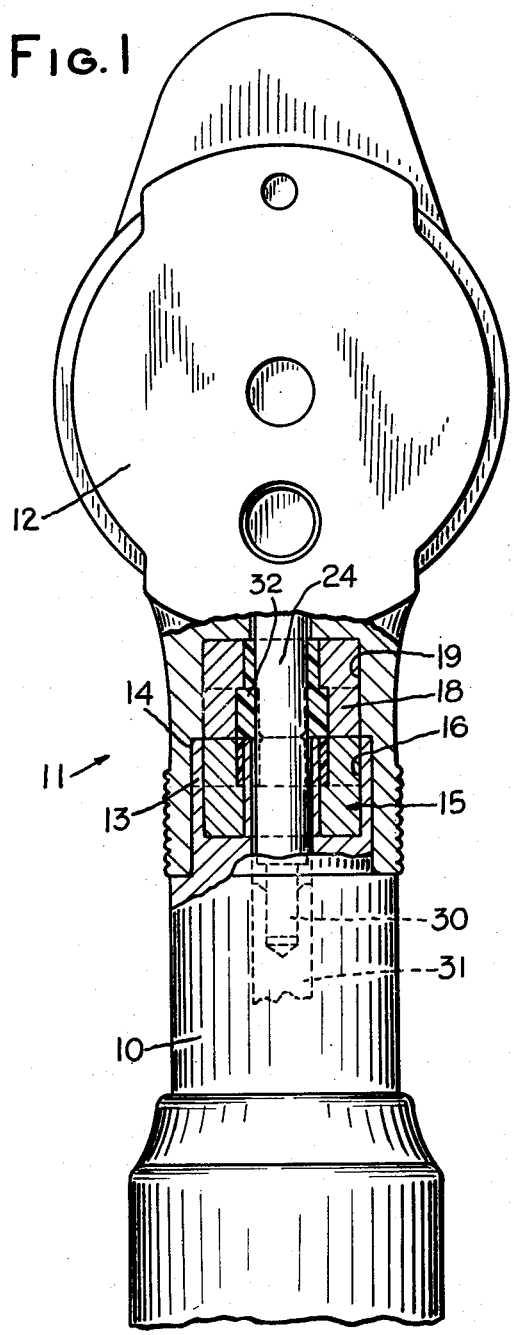
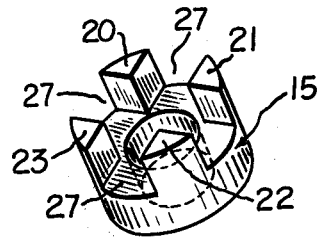
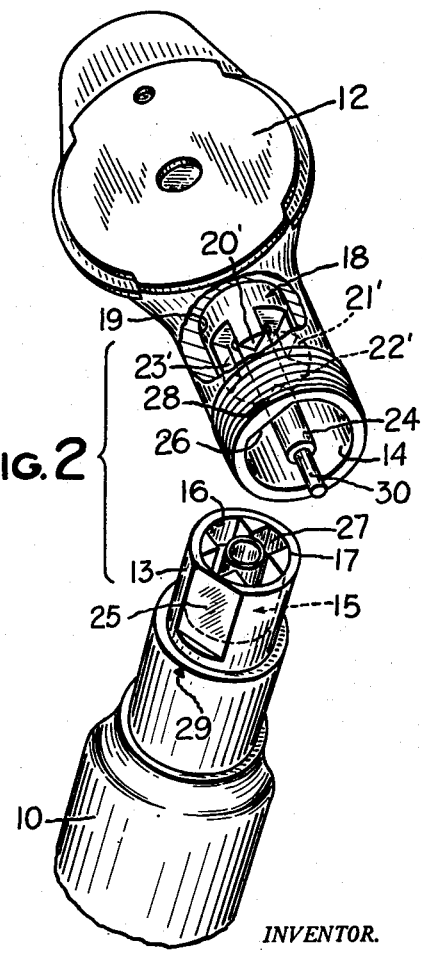
INVENTOR.
R. V. GERHARDT
BY
*G. A. Ellestad*
ATTORNEY Patented May 11, 1954

2,678,228

UNITED STATES PATENT OFFICE 2,678,228

DIAGNOSTIC INSTRUMENT WITH MAGNETIC CONNECTOR

Robert V. Gerhardt, Rochester, N. Y., assignor to Bausch & Lomb Optical Company, Rochester, N. Y., a corporation of New York Application June 8, 1951, Serial No. 230,660

1 Claim. (Cl. 287—119)

This invention relates to diagnostic instruments in which a demountable diagnostic head or the like is held on a handle or supporting part of the instrument by a separable connection.

Illuminated diagnostic instruments such as otoscopes, ophthalmoscopes, and others are usually provided with a separable mechanical connection between the handle or support which holds the battery and the diagnostic head so that different heads may be selectively used and sterilized and serviced. Such connections usually include some loose or inaccessible parts which are hard to sterilize and clean after use. Furthermore, because of the necessary looseness in some types of diagnostic head connections, such as the bayonet joint type, a good electrical contact between the separable contact parts of a lamp circuit in said connection is difficult to maintain and this results in a flickering of the lamp.

An object of this invention is to provide a novel separable connection for diagnostic instruments which is simple and strong in structure, is firm in use, and easy to maintain in a sterile condition. It is a further object to provide a diagnostic instrument having magnetic means for detachably holding the diagnostic head on the handle. Another object is to provide a diagnostic instrument having magnetic means for detachably holding the head on the support and means for orienting the head relative to the support.

Other objects and advantages reside in the novel details of construction and combination of parts which are described in the following specification and are shown in the accompanying drawing in which:

Fig. 1 is a side elevation on an enlarged scale of a diagnostic instrument incorporating one form of my invention.

Fig. 2 is a perspective view of the parts of the instrument in uncoupled position, and Fig. 3 is a perspective view of a preferred form of magnet which is used in the separable connection.

In Fig. 1 of the drawing there is shown a handle or support member 10 of a diagnostic instrument 11 having a diagnostic head 12 mounted on said member. Longitudinal alignment means are provided for aligning the head 12 on the support 10, comprising a cylindrical extension 13 on member 10 slidably fitted within a corresponding cylindrical recess 14 in the head 12. If desired, the contacting surfaces of extension 13 and recess 14 may be slightly tapered to improve the firmness of the joint.

According to this invention, magnetic means are provided for holding the head 12 on the support member 10. In the preferred form of the invention, the magnetic means comprises a permanent magnet 15 housed within an annular recess 16 in the support member 10 and held therein by suitable means such as by spinning a small lip 17 over the magnet adjacent to recess 16. To increase the magnetic attraction, a second magnet 18 is housed in a cylindrical recess 19 in the head 12 wherein it is held in a manner similar to magnet 15. Obvious advantages may be gained by making magnets 15 and 18 duplicates of each other as shown in Fig. 3 and preferably, salient pole pieces 20, 21, 22, and 23 and 20', 21', 22', and 23', respectively, are formed on said magnets to concentrate the magnetic flux in restricted sectional areas. The magnets 15 and 18 are relatively angularly arranged so that the individual pole pieces of one magnet are in mutually attractive position with respect to pole pieces of the other magnet. A suitable hole may be formed in the center of the magnets 15 and 18 to allow passage of an axially extending stem or tube 24 which supports an electrical contact part 30 in a lamp circuit, not shown. Also in the lamp circuit, the electrical contact socket 31 is fixed in the support member 10.

To assure that the magnets are arranged in mutually attractive position whenever the head 12 is assembled on the support 10, suitable means are provided for establishing proper angular relation between these parts, such as a flat surface 25 on the support 10 mating with an inwardly protruding flat surface 26 on the head 12. The poles of the magnets 15 and 18 are angularly arranged with respect to the surfaces 25 and 26, respectively, so that when said surfaces are in engagement, the pole structure of the magnets will be properly oriented.

It is within the scope of this invention to substitute a magnetic body, such as soft iron, for the magnet 15 or the magnet 18 and to provide pole piece structures of various designs for the magnets. It is also contemplated that the spaces 27 between the pole pieces of the magnets 15 and 18 may be filled during the manufacture of the instrument with a suitable non-magnetic substance such as a phenolic plastic 32 to prevent accumulation of foreign matter in these spaces. Preferably, alignment marks 28 and 29 are placed in adjacent positions on the exterior surfaces of the head 12 and the support 10, respectively, to aid in aligning the parts of the instrument during assembly.

In assembling the instrument, it is simply necessary to align the marks 28 and 29 and guide the head 12 onto the support 10 where it is held by the attractive power of magnets 15 and 18. By the use of the coupling mechanism above described, it is readily understood that incorrect assembly of the head 12 on its support 10 is impossible and the pole structure of the magnetic means is always automatically positioned for maximum magnetic effect upon assembly. Furthermore, it will be seen that this invention provides a simple and secure means of holding a demountable head on a diagnostic instrument, said means being advantageously formed to provide an easily cleaned and sterilized instrument. A firm connection is provided so that a good electrical contact is made between the parts of the lamp circuit and flickering of the lamp is eliminated. Although but one form of this invention has been shown and described in detail, it will be understood that changes may be made in the form and arrangement of its parts and substitutions may be made therein without departing from the spirit of the invention as defined in the appended claim.

I claim:

In a diagnostic instrument having a support member, a diagnostic member demountably held on the support member and separable connecting means comprising a cylindrical extension on one member which fits into a cylindrical recess on the other member, the combination of means for holding the extension within the recess comprising a magnet secured within the cylindrical extension and a magnet secured within the recess, each of said magnets having a plurality of spaced pole pieces, the pole pieces on one magnet being the same in number and spacing as those on the other magnet, and means for angularly positioning the extension relative to the recess to position the magnets so that their respective pole pieces of opposite polarity are in aligned abutting relation with each other whereby the magnetic attraction of the pole pieces will detachably hold the diagnostic member on the support member, said means comprising a flat surface on the outer surface of the extension and an inwardly protruding mating flat surface on the inner surface of the recess.

References Cited in the file of this patent

UNITED STATES PATENTS

| Number | Name | Date |
|---|---|---|
| 483,342 | Bolte | Sept. 27, 1892 |
| 2,406,957 | McCarthy | Sept. 2, 1946 |
| 2,475,573 | Smith et al. | July 5, 1949 |

FOREIGN PATENTS

| Number | Country | Date |
|---|---|---|
| 15,377 | Great Britain | July 11, 1903 |
| 462,554 | Germany | July 12, 1928 |
| 645,018 | Great Britain | Oct. 21, 1947 |